US011146521B1

(12) United States Patent
Wu et al.

(10) Patent No.: US 11,146,521 B1
(45) Date of Patent: Oct. 12, 2021

(54) EMAIL PLATFORM WITH AUTOMATED CONTACT SAVE

(71) Applicant: Citrix Systems, Inc., Fort Lauderdale, FL (US)

(72) Inventors: Hao Wu, Nanjing (CN); Bo Zang, Nanjing (CN); Taodong Lu, Nanjing (CN); Tianze Jiang, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/893,523

(22) Filed: Jun. 5, 2020

Related U.S. Application Data

(63) Continuation of application No. PCT/CN2020/091717, filed on May 22, 2020.

(51) Int. Cl.
*G06F 15/16* (2006.01)
*H04L 12/58* (2006.01)
*H04W 88/02* (2009.01)

(52) U.S. Cl.
CPC .............. *H04L 51/18* (2013.01); *H04W 88/02* (2013.01)

(58) Field of Classification Search
CPC ................................ H04L 51/18; H04W 88/02
USPC ........................................................ 709/206
See application file for complete search history.

(56) References Cited

U.S. PATENT DOCUMENTS

| 2003/0064715 | A1 | 4/2003 | Sugane |
| 2003/0158864 | A1* | 8/2003 | Samn ................... G06Q 10/107 |
| 2006/0179114 | A1 | 8/2006 | Deeds |
| 2006/0293905 | A1* | 12/2006 | Ramanathan ......... G06Q 10/10 |
| | | | 709/206 |
| 2010/0106781 | A1* | 4/2010 | Gupta ..................... H04L 51/28 |
| | | | 709/206 |

(Continued)

FOREIGN PATENT DOCUMENTS

| CN | 1997171 A | 7/2007 |
| GN | 1588924 A | 3/2005 |

(Continued)

OTHER PUBLICATIONS

International Search Report and Written Opinion dated Feb. 22, 2021 for PCT/CN2020/091717 filed May 22, 2020; pp. 9.

*Primary Examiner* — Atta Khan
(74) *Attorney, Agent, or Firm* — Hoffman Warnick LLC (57) ABSTRACT

A system and method that automatically saves a message sender's contact information in the local contacts of a message receiver. A described method includes receiving, at a second email client installed on a user device, a message from a first email client via an email server and analyzing the message at the second email client to determine whether the message triggers an automated contact save. In in response to determining that the message triggers the automated contact save and the message includes a requisite contact information of the sender, saving the requisite contact information in a set of local contacts on the user device. In response to determining that the message triggers the automated contact save and the message does not include the requisite contact information of the sender, retrieving the requisite contact information of the sender from an identity server and saving the requisite contact information in the set of local contacts on the user device.

20 Claims, 6 Drawing Sheets

(56) References Cited

U.S. PATENT DOCUMENTS

| | | | |
|---|---|---|---|
| 2011/0191340 A1* | 8/2011 | Cort | H04L 67/1095 |
| | | | 707/732 |
| 2012/0063585 A1* | 3/2012 | Graving | H04M 1/2757 |
| | | | 379/218.01 |
| 2015/0201062 A1* | 7/2015 | Shih | G06F 16/24552 |
| | | | 455/564 |

FOREIGN PATENT DOCUMENTS

| | | |
|---|---|---|
| GN | 101204073 A | 6/2008 |
| WO | 2007142011 A1 | 12/2007 |

* cited by examiner

EMAIL PLATFORM WITH AUTOMATED CONTACT SAVE

BACKGROUND OF THE DISCLOSURE

Users of smartphones regularly receive phone calls from unknown callers, which may include calls from legitimate sources, as well as calls from unwanted sources such as spam, robo-calls, sales calls, etc. Accordingly, when a call is received from a caller that is not saved in the user's local contacts, users tend to ignore the call. Furthermore, in many enterprises, users may not regularly save phone numbers of their colleagues or other phone numbers associated with the enterprise, such as office numbers, meeting room numbers, etc. Accordingly, users may ignore important phone calls from known callers within the enterprise.

BRIEF DESCRIPTION OF THE DISCLOSURE

Aspects of this disclosure provide a system and method that provides an automated save of contact information to a user's local contacts on a smart phone when the user receives a specially formatted message via email from the contact.

A first aspect of the disclosure provides a method that includes receiving, at a second email client installed on a user device, a message from a first email client via an email server and analyzing the message at the second email client to determine whether the message triggers an automated contact save. In in response to determining that the message triggers the automated contact save and the message includes a requisite contact information of the sender, saving the requisite contact information in a set of local contacts on the user device. In response to determining that the message triggers the automated contact save and the message does not include the requisite contact information of the sender, retrieving the requisite contact information of the sender from an identity server and saving the requisite contact information in the set of local contacts on the user device.

A second aspect of the disclosure provides a computing device having a memory and a processor configured to run an email client on the computing device, wherein the email client processes received emails according to a method that includes receiving a message from a sending email client via an email server and analyzing the message to determine whether the message triggers an automated contact save. In response to determining that the message triggers the automated contact save and the message includes a requisite contact information of the sender, the method include saving the requisite contact information in a set of local contacts on the computing device. In response to determining that the message triggers the automated contact save and the message does not include the requisite contact information of the sender, the method includes retrieving the requisite contact information from an identity server and saving the requisite contact information in the set of local contacts on the computing device.

A third aspect of the disclosure provides an enterprise platform that includes an email server, wherein the email server is configured to route a message from a first email client to a second email client, and wherein the message is processed according to a method that includes receiving the message from a sender associated with the first email client. The method further includes determining whether the message includes a triggering condition to cause an automated contact save on a device running the second email client and determining whether the sender has permission to effectuate the automated contact save. In response to determining that the message includes the triggering condition and the sender has permission, the method includes routing the message to the second email client with the triggering condition to effectuate the automated contact save on the device. In response to determining that the message includes the triggering condition and the sender does not have permission, the method includes routing the message to the second email client without the triggering condition or with a reverse tag to prevent the automated contact save on the device.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for processing email messages within an enterprise email platform. In particular, an enterprise email platform is provided that allows a first user (i.e., a sender) of message on a first email client to cause their contact information to be saved in the local contacts of a second user (i.e., a receiver) of the message on a device (e.g., a smartphone, a vehicle, etc.) running a second email client. This thus allows the second user to recognize the first user when, in the future, the first user calls the second user's device. In addition to routing messages, an email server is implemented that acts as a gatekeeper that ensures the sender has permission to cause an automated save on the receiver's device. Further, an identity server may be utilized by a receiver's email client to retrieve requisite contact information of the sender, such as the sender's phone number, when such information is not contained in the message.

Figure 1:
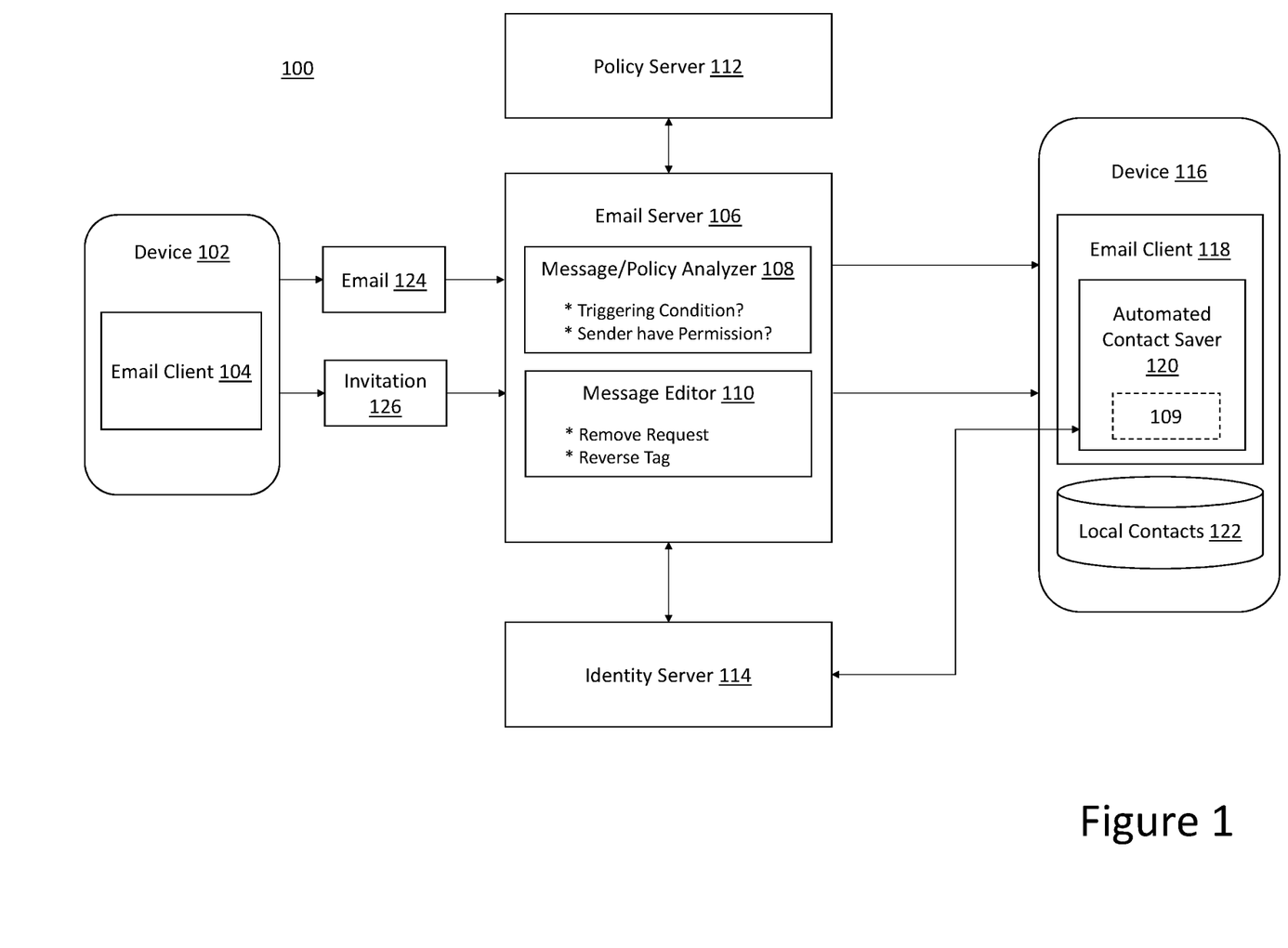
FIG. 1 depicts an illustrative enterprise email platform, in accordance with an illustrative embodiment.

FIG. 1 depicts an illustrative enterprise email platform 100 that includes an email server 106, a first email client 104 running on a first user device ("sending device") 102, and a second email client 118 running on a second user device ("receiving device") 116. In this example, device 116 includes a smartphone or the like that stores a set of local contacts 122, such that when a call is received from a known caller, the contact information of the caller is displayed on receiving device 116. Sending device 102 may include any type of client device, e.g., a laptop, smartphone, desktop, etc., capable of sending an email message to users within the enterprise. As noted, platform 100 provides an infrastructure through which a user of the first user device 102 can send a message to a user of the second user device 116 and have their contact information automatically saved to the local contacts 122 of the second user. In this illustrative embodiment, email client 118 on the second user device 116 includes an automated contact saver 120 that processes the received message and automatically saves the contact information of the sender.

In the depicted example of FIG. 1, two types of messages from the first user device 102 are contemplated, including an email message 124 and an invitation message 126 (such as calendar or meeting invite). In order to effectuate or trigger the automated contact save process, the sent message 124, 126 must include a triggering condition. In the case of an email message 124, the triggering condition may include a predefined format of the email 124, such as including a formatted string in the email body or a specified attachment to the email 124. In the case of an invitation message 126, the triggering condition may be implied (i.e., assumed to be met) so long as the invitation message 126 includes a host name and/or meeting location (e.g., a meeting room).

Acceptable types of emails 124 that trigger the automated save process may be defined by the policy server 112. In one example, an acceptable formatted email type may include all emails having an email attachment of a defined name, such as "contact_import.txt." In other cases, defined strings either in the email body or in the aforementioned email attachment may comprise formatted email types that provide the triggering condition. For instance, strings of the following formats may be defined in the policy server 112, along with examples that may be included the message and results:

In the case where the email includes a valid triggering condition and the sender has permission to effectuate the automated contact save, the message is forwarded unchanged to the second email client 118. In the case where the email includes a valid triggering condition but the sender does not have permission to effectuate the automated contact save, message editor 110 is deployed to edit the message and remove the triggering condition, e.g., by removing the formatted string or attachment. Alternatively, message editor 110 may apply an override to the triggering condition, e.g., by including a "reverse tag" in the message body, e.g., |DoNotSave|, or by including or renaming the attachment, such as DoNotSave.txt.

In the case where the email does not include a triggering condition, the email is simply routed as a normal email.

Regardless, once the message is received by the second the second email client 118, the message is displayed for the user (as would normally occur) and automated contact saver 120 determines whether contact information of the sender should be saved into the local contacts 122. Namely, if the message includes a triggering condition, the contact information is saved. However, in some cases, all of the requisite contact information of the sender may not be included in the received message. For example, the message may only include the email address of the sender, but not the sender's actual name and/or phone number. In this case, automated contact saver 120 can interface with the identity server 114 to perform a lookup to obtain the requisite contact information.

In an alternative embodiment, a local message/policy analyzer 109 could be implemented at the device 116, in addition to, in coordination with, or in place of the message/policy analyzer 108 on the email server 106. In such an embodiment, the email client 118 (as opposed to or in addition to the email server 106) can determine if the sender

| Format | Example | Result |
| --- | --- | --- |
| \|Sender Name\|+phone num\| | \|Bob Smith\|+1 555 555 5555\| | Store contact info |
| \|Sender Name\|##ID_SERVER##\| | \|Bob Smith\|##ID_SERVER##\| | Lookup/Store info |
| \|#Survey\|+phone num,phone num 2\| | \|#Survey\|555-555-5555, 555-5554 | Store info for survey |
| \|#Room <name>\|+phone number\| | \|#Room D123\| 555-555-5555 | Store room info |
| \|#Room <name>\|##ID_SERVER##\| | \|#Room D123\|##ID_SERVER##\| | Lookup/Store room info |

Other potential triggering conditions may include a code, image, link, etc., appearing anywhere in the email body or subject line. For example, a specially formatted signature block appearing at the bottom of the sender's message could trigger the automated save process.

Regardless, when a message is received by the email server 106, a message/policy analyzer 108 analyzes the message to determine whether a triggering condition exists and whether the sender has permission to effectuate an automated contact save at the receiver's device 116. Policy server 112 may be utilized to check both requirements. Namely, analyzer 108 may first determine whether a triggering condition exists, e.g., does the message include a defined file attachment name, is a defined string format detected in the email body or attachment, and/or does the message (e.g., an invitation 126) implicitly provides the triggering condition. If a triggering condition exists, then a determination is made, using the policy server 112, whether the sender of the message has permission to effectuate an automated contact save at the receiver's device 116. In this case, policy server 112 may for example include a table of all users and permissions relative to one another.

has permission to store their contact information in the local contacts 122. In one approach, the email client 118 could ask the user of the device 116 (e.g., via a displayed message) whether or not to save the contact information in response to a request to save. In another approach, the local message/policy analyzer 109 could either ping the policy server 112 or perform a local table look-up for permission information.

Figure 2:
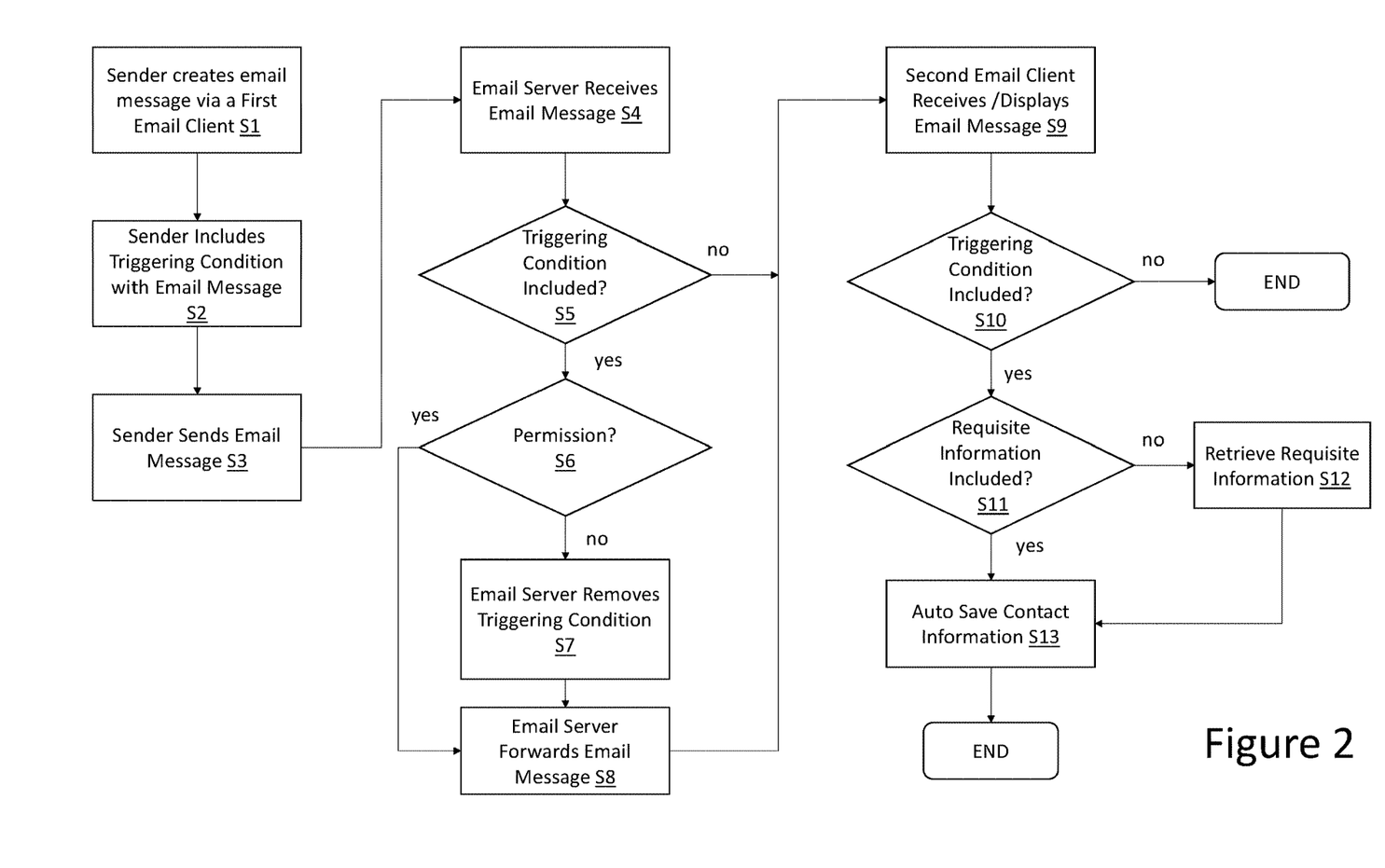
FIG. 2 depicts a flow diagram of a process for processing email messages, in accordance with an illustrative embodiment.

FIG. 2 depicts an illustrative flow for processing an email message 124 with reference to FIG. 1. Initially, at S1, a sender who desires to store their contact information in a receiver's local contacts 122 creates an email message 124 at the first email client 104. To effectuate the automated save process, the sender includes a triggering condition with the email message 124 at S2, e.g., a predefined formatted string, a predefined attachment, etc., and at S3 sends the email message 124.

At S4, the email message 124 is received by the email server 106, and at S5 a determination is made whether a triggering condition is included. If no at S5, then the email message 124 is forwarded to the second email client 118 in a normal fashion. If a triggering condition is included (yes at S5), then at S6 the email server 106 determines whether the sender has permission to effectuate the automated save process (e.g., by checking with the policy server 112). If yes at S6, then the email message 124 is forwarded to the second email client 118 with the triggering condition included. If no at S6, the email server 106 removes the triggering condition, e.g., by deleting the formatted string, removing the predefined attachment, including an override, etc., and then forwards the modified email message 124 to the second email client 118.

At S9, the second email client 118 receives and displays the email message 124, and then determines if a triggering condition is included at S10. If no at S10, the process ends. If yes at S10, then at S11 a determination is made whether the email message 124 includes all the requisite information (e.g., phone number, name of the sender, etc.) needed to complete the automated save process. If no at S11, then the requisite information of the sender is retrieved from the identity server 114 at S12 and the sender's contact information is automatically saved in the receiver's local contacts 122 at S13. If the requisite information is included in the email message 124 (yes at S11), then contact information is saved without retrieving information from the identity server 114.

Figure 3:
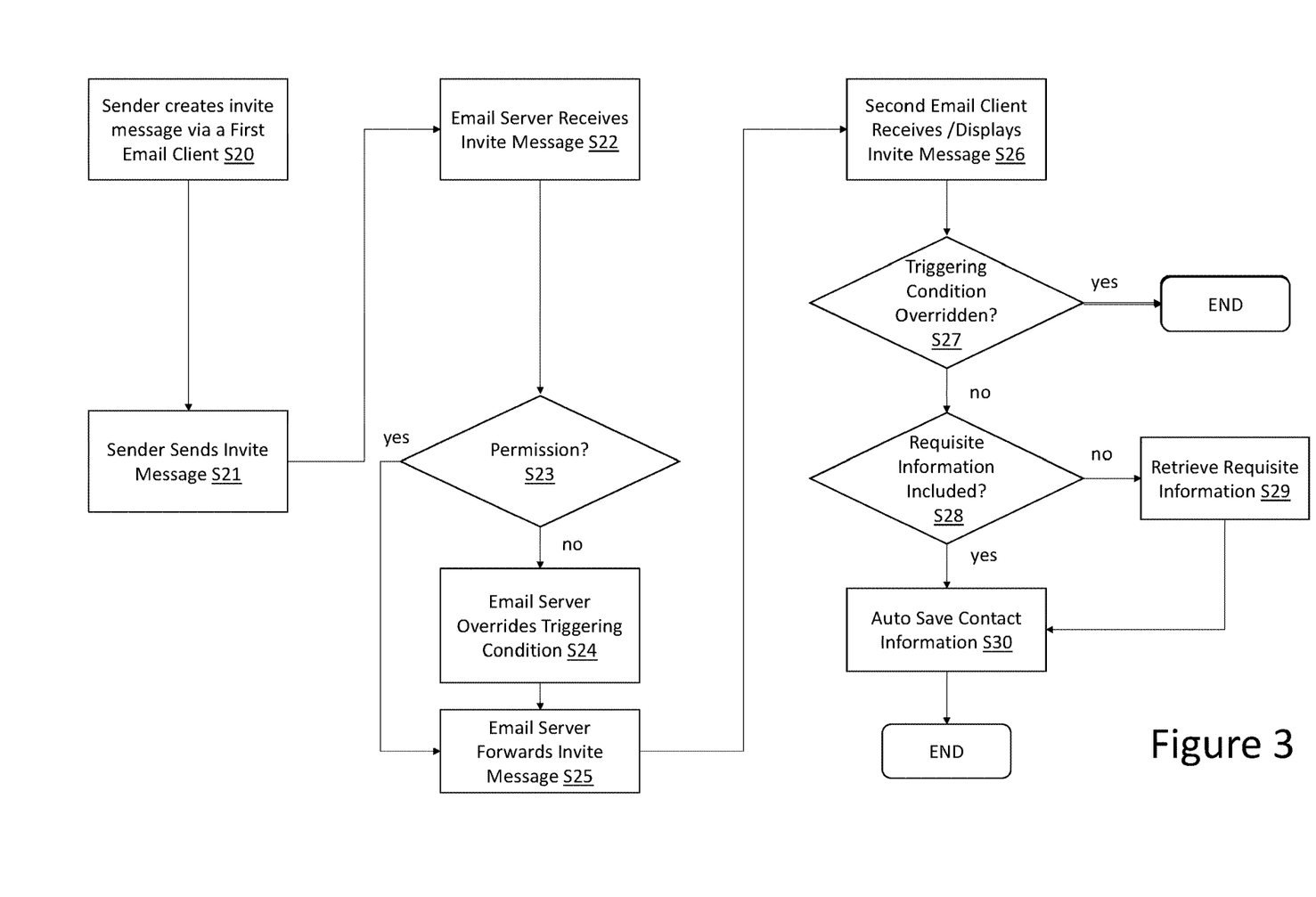
FIG. 3 depicts a flow diagram of a process for processing invitation messages, in accordance with an illustrative embodiment.

FIG. 3 depicts an illustrative flow for processing an invitation message 126, with reference to FIG. 1. Initially, at S20, a sender who desires to store their contact information in a receiver's local contacts 122 creates an invitation message 126 (e.g., a meeting or calendar invite) at the first email client 104 and at S21 sends the invitation message 126. In this case, the triggering condition is implicitly included since the message comprises an invitation, so no additional step is required by the sender.

At S22, the invitation message 126 is received by the email server 106, and at S23 the email server 106 determines whether the sender has permission to effectuate the automated save process (e.g., by checking with the policy server 112). As noted, in this example, the triggering condition is implied. If no permission is determined at S23, the email server 106 overrides the triggering condition, e.g., by including a reverse tag, etc., and then forwards the modified invitation message 126 to the second email client 118.

At S26, the second email client 118 receives and displays the invitation message 126, and then at S27 determines if the triggering condition was overridden. If yes at S27, the process ends. If no at S27, then at S28 a determination is made whether the invitation message 126 includes all the requisite information (e.g., phone number, name of the sender, etc.) needed to complete the automated save process. If no at S28, then the requisite information of the sender is retrieved from the identity server 114 at S29 and the sender's contact information is automatically saved in the receiver's local contacts 122 at S30. If the requisite information is included in the invitation message 126 (yes at S28), then contact information is saved at S30 without retrieving information from the identity server 114.

It is understood that the described triggering conditions, message types, override examples, requisite contact information, order of processing, etc., are for provided for illustrative purposes only. Alterations and modifications can be readily made. For example, all or certain types of email messages (e.g., those directed to a single user) may be recognized as implicitly including a triggering condition. Further, triggering conditions may be included in the subject line of the email message, or via a check box or the like in the email client. Similarly, triggering conditions could for example be overridden by the email server 106 by including a reverse tag in the subject line or the meeting location of an invitation or email message, or via a separate email message generated by the email server 106. Furthermore, the sender of the message can seek to save information for one or more other contacts (other than his or her own contact information), e.g., a group of colleagues, a meeting room phone number, etc.

Figure 4:
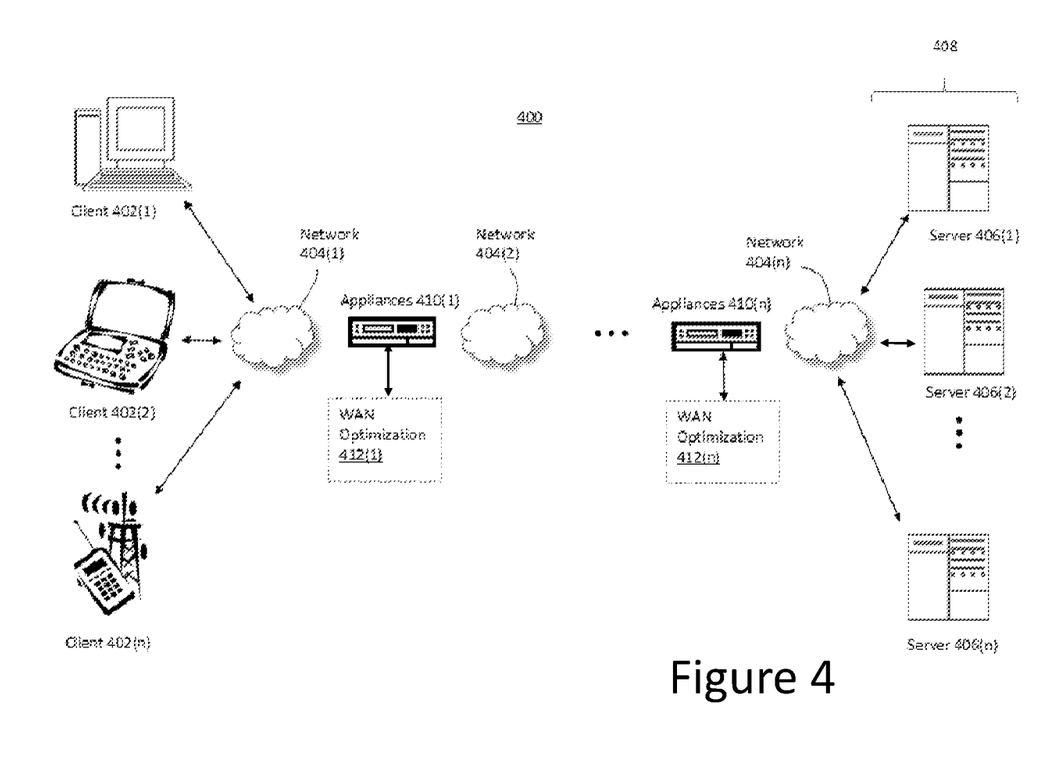
FIG. 4 depicts a network infrastructure, in accordance with an illustrative embodiment.

Referring to FIG. 4, an illustrative network environment 400 is depicted suitable for implementing an enterprise email platform. Network environment 400 may include one or more clients 402(1)-402(n) (also generally referred to as local machine(s) 402 or client(s) 402) in communication with one or more servers 406(1)-406(n) (also generally referred to as remote machine(s) 406 or server(s) 406) via one or more networks 404(1)-404n (generally referred to as network(s) 404). In some embodiments, a client 402 may communicate with a server 406 via one or more appliances 410(1)-410n (generally referred to as appliance(s) 410 or gateway(s) 410).

Although the embodiment shown in FIG. 4 shows one or more networks 404 between clients 402 and servers 406, in other embodiments, clients 402 and servers 406 may be on the same network 404. The various networks 404 may be the same type of network or different types of networks. For example, in some embodiments, network 404(1) may be a private network such as a local area network (LAN) or a company Intranet, while network 404(2) and/or network 404(n) may be a public network, such as a wide area network (WAN) or the Internet. In other embodiments, both network 404(1) and network 404(n) may be private networks. Networks 404 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 4, one or more appliances 410 may be located at various points or in various communication paths of network environment 400. For example, appliance 410(1) may be deployed between two networks 404(1) and 404(2), and appliances 410 may communicate with one another to work in conjunction to, for example, accelerate network traffic between clients 402 and servers 406. In other embodiments, the appliance 410 may be located on a network 404. For example, appliance 410 may be implemented as part of one of clients 402 and/or servers 406. In an embodiment, appliance 410 may be implemented as a network device such as Citrix networking (formerly NetScaler®) products sold by Citrix Systems, Inc. of Fort Lauderdale, Fla.

As shown in FIG. 4, one or more servers 406 may operate as a server farm 408. Servers 406 of server farm 408 may be logically grouped, and may either be geographically co-located (e.g., on premises) or geographically dispersed (e.g., cloud based) from clients 402 and/or other servers 406. In an embodiment, server farm 408 executes one or more applications on behalf of one or more of clients 402 (e.g., as an application server), although other uses are possible, such as a file server, gateway server, proxy server, or other similar server uses. Clients 402 may seek access to hosted applications on servers 406.

As shown in FIG. 4, in some embodiments, appliances 410 may include, be replaced by, or be in communication with, one or more additional appliances, such as WAN optimization appliances 412(1)-412(n), referred to generally as WAN optimization appliance(s) 412. For example, WAN optimization appliance 412 may accelerate, cache, compress or otherwise optimize or improve performance, operation, flow control, or quality of feature of network traffic, such as traffic to and/or from a WAN connection, such as optimizing Wide Area File Features (WAFS), accelerating Server Message Block (SMB) or Common Internet File System (CIFS). In some embodiments, appliance(s) 412 may be a performance enhancing proxy or a WAN optimization controller. In one embodiment, appliance 412 may be implemented as Citrix SD-WAN products sold by Citrix Systems, Inc. of Fort Lauderdale, Fla.

In described embodiments, clients 402, servers 406, and appliances 410 and 412 may be deployed as and/or executed on any type and form of computing device, such as any desktop computer, laptop computer, or mobile device capable of communication over at least one network and performing the operations described herein. For example, clients 402, servers 406 and/or appliances 410 and 412 may each correspond to one computer, a plurality of computers, or a network of distributed computers such as computing device 300 shown in FIG. 6.

Figure 5:
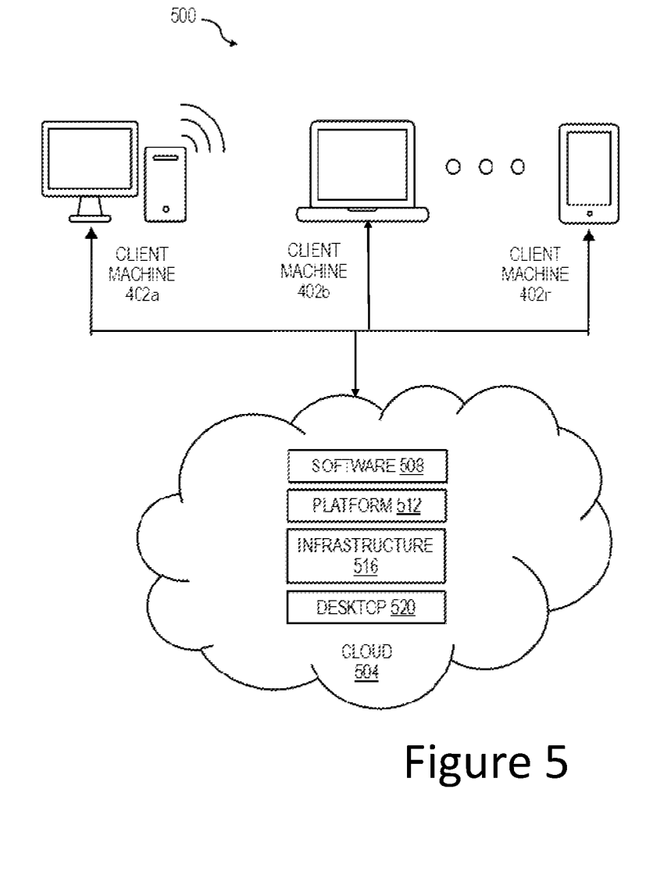
FIG. 5 depicts a cloud computing diagram, in accordance with an illustrative embodiment.

Referring to FIG. 5, a cloud computing environment 500 is depicted, which may also be referred to as a cloud environment, cloud computing or cloud network. The cloud computing environment 500 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 500, one or more clients 402a-402n (such as those described above) are in communication with a cloud network 504. The cloud network 504 may include back-end platforms, e.g., servers, storage, server farms or data centers. The users or clients 402a-402n can correspond to a single organization/tenant or multiple organizations/tenants. More particularly, in one example implementation the cloud computing environment 500 may provide a private cloud serving a single organization (e.g., enterprise cloud). In another example, the cloud computing environment 500 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 500 may provide a hybrid cloud that is a combination of a public cloud and a private cloud. Public clouds may include public servers that are maintained by third parties to the clients 402a-402n or the enterprise/tenant. The servers may be located off-site in remote geographical locations or otherwise.

The cloud computing environment 500 can provide resource pooling to serve multiple users via clients 402a-402n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 500 can provide on-demand self-service to unilaterally provision computing capabilities (e.g., server time, network storage) across a network for multiple clients 402a-402n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 500 can provide an elasticity to dynamically scale out or scale in response to different demands from one or more clients 402. In some embodiments, the cloud computing environment 500 can include or provide monitoring services to monitor, control and/or generate reports corresponding to the provided shared services and resources.

In some embodiments, the cloud computing environment 500 may provide cloud-based delivery of different types of cloud computing services, such as Software as a service (SaaS) 508, Platform as a Service (PaaS) 512, Infrastructure as a Service (IaaS) 516, and Desktop as a Service (DaaS) 520, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 6:
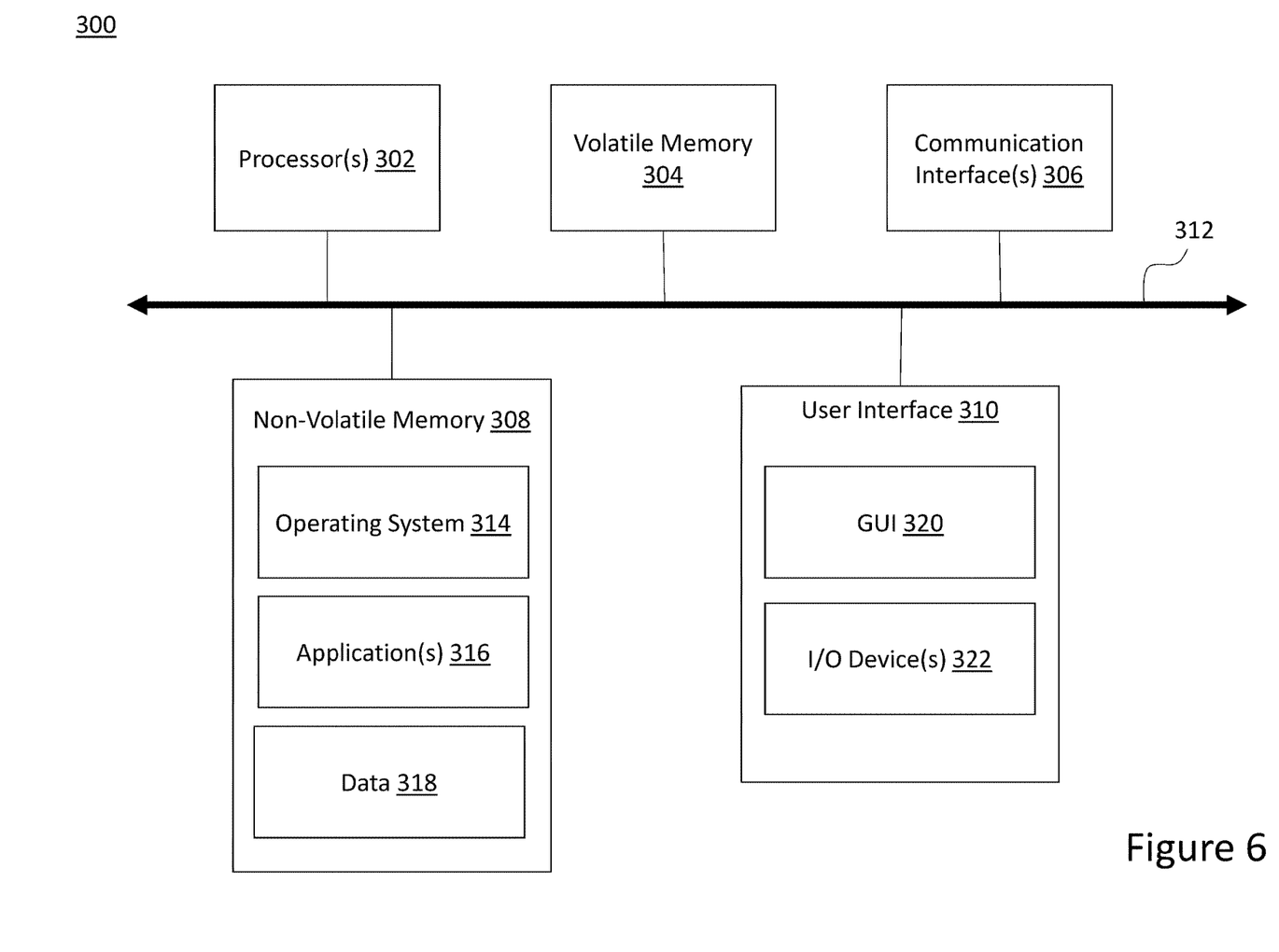
FIG. 6 depicts a computing system, in accordance with an illustrative embodiment.

Elements of the described solution may be embodied in a computing system, such as that shown in FIG. 6 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 6 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, comprising:
analyzing a message sent from a sender using a first email client to a second email client installed on a user device to determine whether the message includes a triggering condition for triggering an automated contact save on the user device;
in response to determining that the message includes the triggering condition for triggering the automated contact save and the sender does not have permission to effectuate the automated contact save, routing the message to the second email client without the triggering condition or with a tag to prevent the automated contact save on the user device;
in response to determining that the message includes the triggering condition for triggering the automated contact save and the message includes a requisite contact information of the sender, saving the requisite contact information in a set of local contacts on the user device; and
in response to determining that the message includes the triggering condition for triggering the automated contact save and the message does not include the requisite contact information of the sender, retrieving the requisite contact information of the sender from an identity server and saving the requisite contact information in the set of local contacts on the user device.

2. The method of claim 1, wherein the user device includes a smart phone.

3. The method of claim 1, wherein the requisite contact information includes a phone number.

4. The method of claim 1, wherein the automated contact save is triggered in response to a triggering condition being detected from the message.

5. The method of claim 4, wherein the triggering condition includes detection of a formatted string provided in a body of the message by the sender of the message.

6. The method of claim 4, wherein the triggering condition includes detection of an attachment to the message having a predefined name.

7. The method of claim 1, wherein routing the message to the second email client without the triggering condition further comprises deploying a message editor to remove the triggering condition from the message prior to routing the message to the second email client.

8. The method of claim 1, wherein the message includes one of an email message or an invitation.

9. A computing device, comprising:
a memory; and
a processor configured to run an email server on the computing device, wherein the email server processes received emails according to a method that includes:
analyzing a message received from a sending email client to determine whether the message includes a triggering condition for triggering an automated contact save;
in response to determining that the message includes the triggering condition for triggering the automated contact save and a sender of the message does not have permission to effectuate the automated contact save, routing the message to a receiving email client installed on a user device without the triggering condition or with a tag to prevent the automated contact save on the user device;
in response to determining that the message includes the triggering condition for triggering the automated contact save and the message includes a requisite contact information of a sender, saving the requisite contact information in a set of local contacts on the user device; and
in response to determining that the message includes the triggering condition for triggering the automated contact save and the message does not include the requisite contact information of the sender, retrieving the requisite contact information from an identity server and saving the requisite contact information in the set of local contacts on the user device.

10. The computing device of claim 9, wherein the computing device includes a smart phone.

11. The computing device of claim 9, wherein the in the requisite contact information includes a phone number.

12. The computing device of claim 9, wherein the automated contact save is triggered in response to a triggering condition being detected from the message.

13. The computing device of claim 12, wherein the triggering condition includes detection of a formatted string entered in a body of the message by the sender of the message.

14. The computing device of claim 12, wherein the triggering condition includes detection of an attachment to the message having a predefined name.

15. The computing device of claim 9, wherein routing the message to the receiver email client without the triggering condition further comprises deploying a message editor to remove the triggering condition from the message prior to routing the message to the receiving email client.

16. The computing device of claim 9, wherein the message includes one of an email message or an invitation.

17. An enterprise platform, comprising:
an email server, wherein the email server is configured to route a message from a first email client to a second email client, and wherein the message is processed according to a method that includes:
receiving the message from a sender associated with the first email client;
determining whether the message includes a triggering condition to cause an automated contact save on a device running the second email client and determining whether the sender has permission to effectuate the automated contact save;
in response to determining that the message includes the triggering condition to cause the automated contact save and the sender has permission to effectuate the automated contact save, routing the message to the second email client with the triggering condition to effectuate the automated contact save on the device; and
in response to determining that the message includes the triggering condition to cause the automated contact save and the sender does not have permission to effectuate the automated contact save, routing the message to the second email client without the triggering condition or with a tag to prevent the automated contact save on the device.

18. The enterprise platform of claim 17, further comprising a policy server that determines whether the sender associated with the first email client has permission to effectuate the automated contact save.

19. The enterprise platform of claim 17, further comprising an identity server configured to provide a phone number of the sender to the second email client.

20. The enterprise platform of claim 17, wherein the message includes one of an email message or an invitation.

* * * * *